Jan. 1, 1935.  C. OFFENHAUSER  1,986,115
APPARATUS FOR COOKING
Filed Aug. 28, 1931  2 Sheets-Sheet 1
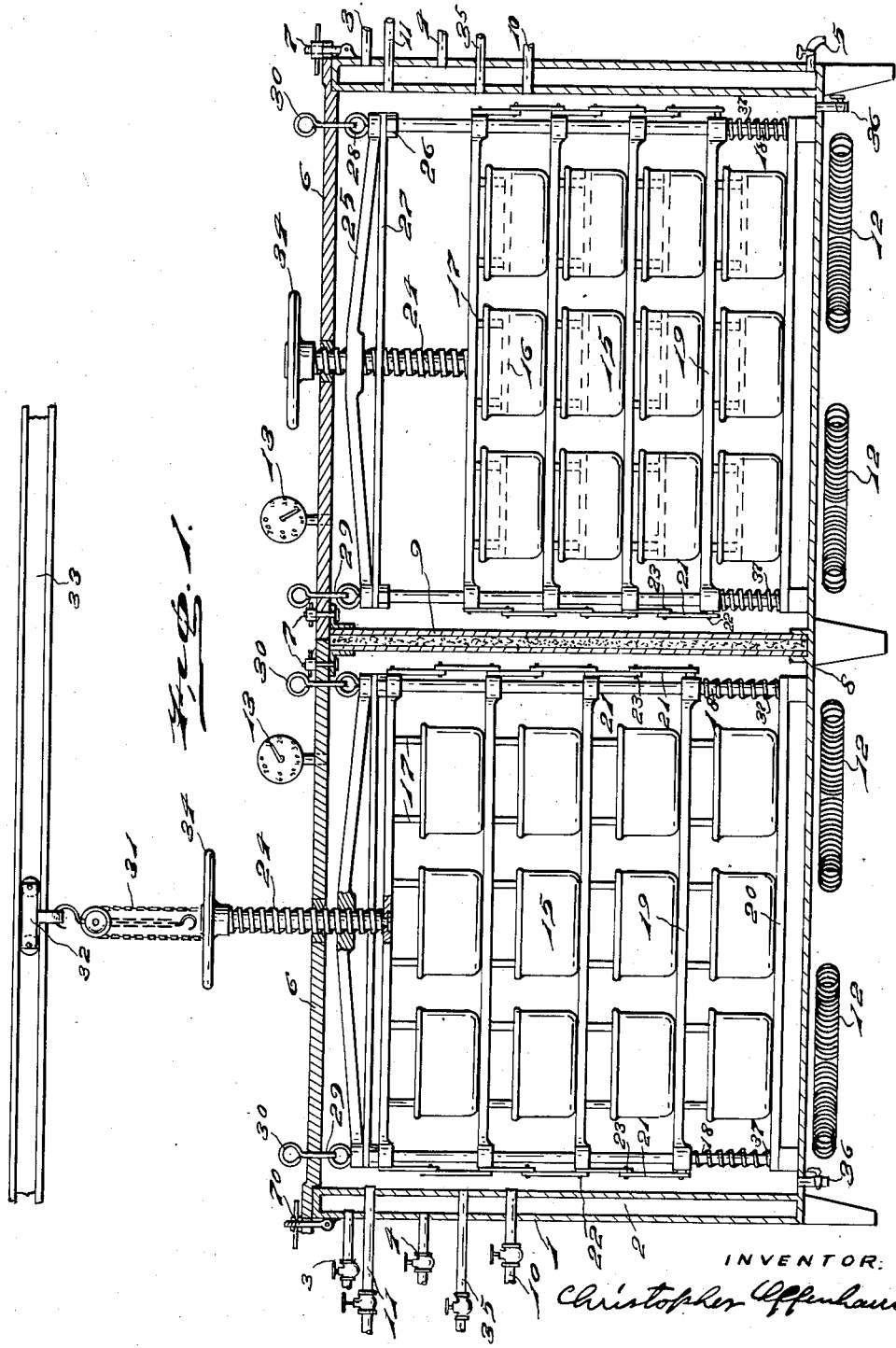
INVENTOR:
Christopher Offenhauser
Herbert S. Fairbanks
ATTORNEY.

Jan. 1, 1935.　　　C. OFFENHAUSER　　　1,986,115
APPARATUS FOR COOKING
Filed Aug. 28, 1931　　2 Sheets-Sheet 2
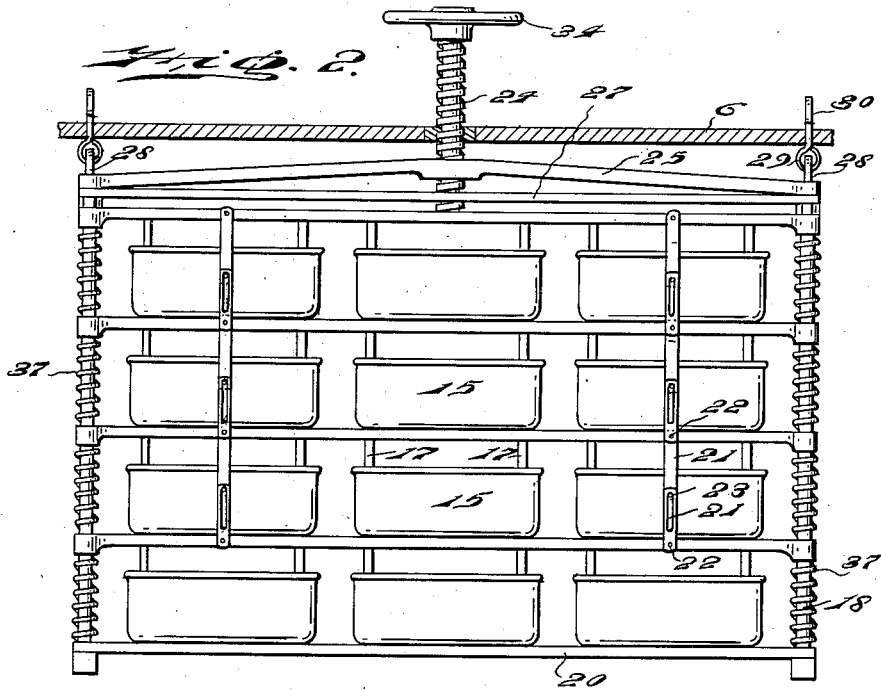
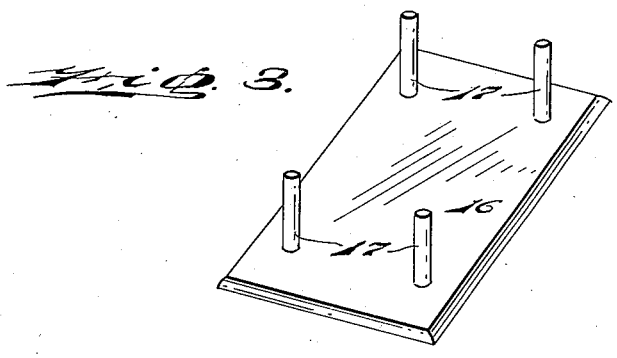
INVENTOR.
Christopher Offenhauser
BY
Herbert S. Fairbanks
ATTORNEY.

Patented Jan. 1, 1935

1,986,115

UNITED STATES PATENT OFFICE 1,986,115

APPARATUS FOR COOKING

Christopher Offenhauser, Philadelphia, Pa.

Application August 28, 1931, Serial No. 559,868

7 Claims. (Cl. 99—2)

The object of this invention is to devise a novel apparatus for cooking, which is especially designed for the cooking of meat but which can be employed for the heat treatment of any desired material.

A further object is to devise a novel apparatus for cooking wherein the articles to be cooked can be subjected to a boiling liquid, steam, steam which has been superheated, or to a combination of such steps.

It is now the practice to cook meat in a loaf form with the bone removed so that the cooked meat can be sliced in a conventional slicing machine. This is especially true of ham and pork products which are placed in a container and subjected to pressure and a cover is then applied and locked in position and the ham in the container is subjected to a cooking action, such as, for example, boiling. In some establishments several hundred hams a day are cooked in this manner and considerable hand labor is necessary as the hams have to be placed in their containers and placed under a pressure and thereafter the cover is locked in position and the hams cooked. This necessitates the individual removal of each ham cooker while hot, from the tank in which it is cooked. The cooked hams after being allowed to cool are then compressed and individually placed in a cooling chamber or refrigerator.

It is the object of my present invention to devise novel means whereby a large number of hams, or other material, may be handled as a unit, the containers in which the hams are placed being carried by a novel construction and arrangement of a rack having means to apply pressure to the covers so that during the cooking additional pressure may be applied and also during the cooling, and, if desired, while the hams are in the refrigerator, so that a uniformly shaped product can be obtained in which the juices and flavors are retained.

A further object is to devise novel type of covers for the article containers.

With the above and other objects in view, as will hereinafter more clearly appear, my invention comprehends a novel method of and apparatus for cooking.

It further comprehends a novel cooker and presser wherein one or more carriers are provided having means to receive a large number of article containers and provided with means to exert and maintain a desired pressure on the covers of such containers while the article containers are in their carrier.

It further comprehends a novel cooker and presser wherein a novel article carrier is employed having movable shelves to receive the articles and to press against, by a preferably continuous pressure, the covers for the article containers supported on the shelves, means being also provided to limit relative movement of the shelves and adjustable means also being provided for exerting a desired pressure against the shelves.

It further comprehends a novel construction and arrangement of a carrier receiving tank and novel means for placing the carriers in the tanks and removing them therefrom.

It further comprehends a novel closed tank having compartments and adapted, at the will of the operator, to receive a liquid or steam, and novel heating means for the compartments.

Other novel features of construction and advantage will hereinafter more clearly appear in the detailed description and the appended claims.

For the purpose of illustrating the invention, I have shown in the accompanying drawings a typical embodiment of it, which, in practice, will give satisfactory and reliable results. It is, however, to be understood that the various instrumentalities of which my invention consists can be variously arranged and organized, and my invention is not limited to the exact arrangement and organization of these instrumentalities as herein set forth.

Figure 1 is a sectional elevation of an apparatus for cooking, embodying my invention.

Figure 2 is an end elevation of a carrier.

Figure 3 is a perspective view of a cover which may be employed for the article containers.

Similar numerals of reference indicate corresponding parts.

Referring to the drawings:—

1 designates a tank having a jacket 2 provided with an inlet 3 for a heating medium and an inlet 4 for a cooling medium. 5 is a valve controlled discharge outlet from the water jacket. The tank is provided with a sectional cover 6 to seal its open top, and each cover is detachably secured in position by means of fastening devices 7 of any desired construction. The tank is provided with guides 8 for a partition 9, removable by upward displacement, when desired.

10 designate valve controlled steam inlets, and 11 designate valve controlled water inlets for hot or cold water, all of such inlets leading from a source of supply and discharging into the sections of the tank.

It will be noted from Figure 1 that each section or compartment of the tank is provided with one or more sources of heat 12 of any desired character, and, as illustrated, I have shown beneath the bottom of each compartment an electrical heating unit disposed alongside of another electrical heating unit. The bottom of the tank is not jacketed. The partition 9 is insulated and, as shown in Figure 1, consists of two plates between which is disposed insulating material such as, for example, a sheet of asbestos.

The cover 6 is provided with a temperature gauge 13 so that the operator can readily ascertain the temperature which is being maintained in each cooking compartment. Each compartment is also provided with a conventional vent 14.

The articles which are to be cooked are placed in pans or containers 15 having removable covers 16 which are provided near each of the four corners with the upstanding lugs or posts 17. The carrier is in the form of a rack provided with corner posts 18 on which are slidably mounted the shelves 19. The lowermost shelf 20 is stationary and the movable shelves 19 have pivotally connected to them slotted links 21 by means of fastening devices 22. The upper links 23, fixed to the upper shelves, have the pins 23 passing through the slots. The uppermost link is pivoted to the uppermost shelf which forms a pressure transmitting member and are in the form of sheet metal plates. The movement of the shelves 19 is effected by a pressure screw 24 in threaded engagement with the cross bar 25 which is in the form of a spider with diagonal bars and a hub, the bars being fixed to the corner posts 18 by means of the nuts 26 which bear against the brace members 27, the ends of which are mounted on the corner posts 18. The corner posts at their upper ends are provided with the hooks 28. Each cover section is connected with the hooks 28 by means of fastening devices 29. Each cover section is provided with rings 30 which are adapted to be connected with the chain of a hoist 31 connected with a trolley 32 mounted on an over-head track 33 which preferably leads from a filling place for the article containers to the tank and therefrom to a refrigerating chamber. The feed screws 24 extend through the sections of the cover 6 and are provided with handles 34 exteriorly of the cover so that the pressure on the articles in the article containers can be adjusted during the cooking operation.

Each compartment of the tank is provided with a vacuum pipe 35 adapted to be connected with a conventional vacuum pump, not shown, so that any or all of the compartments will have a vacuum therein.

The inlet to the jacket of the tank is preferably provided with an automatic regulator so that a desired steam pressure can be maintained. An automatic steam regulator is also provided for the steam pipes communicating with the compartments.

The operation will now be readily apparent to those skilled in this art and is as follows.

In accordance with this invention the articles may be cooked in a boiling liquid, hot water, steam, in a vacuum, or they may be subjected to a baking action, with a desired pressure in a compartment or with a vacuum in such compartment.

It is well known that the time requisite for cooking an edible article depends upon its weight, for example, a ham which weighs only eight pounds does not take the same amount of time to cook as a ham which weighs fifteen pounds. For this reason articles of approximately the same weight are placed in the same carrier, so that they may be removed from their compartment when done without interfering with the cooking operation which is taking place in another compartment.

In accordance with this invention ham, for example, may be partially boiled or steamed, the water in the compartment then drained off, the current turned on the electrical heating unit, and the cooking completed by a baking action so that the outer surface of the article being cooked will be crisp and browned.

The articles are placed in the article containers 15 and the covers 16, which serve as press plates, are placed in the position, and, if desired, an initial pressure applied thereto. The containers are then placed on the shelves, filling the carrier to its capacity, which may be several hundred containers. The section of the cover 6 is then lowered and sealed in position over the compartment in which the carrier has been placed. The proper valve is now opened to admit hot water or steam into the compartment or the vacuum pump is started to exhaust air or steam from the compartment.

The articles are thus subjected for a desired length of time to the action of boiling water or of steam. The water or steam can be removed from the tank and the cooking action completed by dry heat. The articles can be cooled without removal from the tank by passing a cooling medium through the water jacket or by draining off the liquid in which they are cooked and passing cooling water into the compartments in which they have been cooked.

As shrinkage occurs during the cooking, the pressure on the articles can be increased by actuating the feed screws.

After the articles are cooked fastening devices for a cover section are released, the chain hoist is connected with the cover, and the cover and article carrier are raised out of the compartment and moved into the cooling or refrigerating chamber. While they are in the refrigerating chamber, the pressure on the articles can be increased by actuating the feed screw of an individual carrier.

When the articles are removed from their article containers they will have a pressed and moulded form conforming to the shape of the container in which they have been cooked.

The articles of food in the article containers can be partially or wholly cooked by the action of hot water in their compartment or by the action of steam and the steam may be superheated by the source of heat beneath the compartment.

If the articles are to be partially boiled the water in the compartment can be drained off through the valve control connection 36. The articles can then be subjected to steam or to steam which has been superheated by the external sources of heat, or simply the dry heat employed produced by the external source of heat beneath a compartment.

One can also maintain a vacuum in a cooking chamber of a compartment during the baking operation.

When the pressure feed screw is unscrewed the pressure transmitting member, which has swivelled connection with said feed screw, is raised, thereby separating the shelves so that the article containers can be readily removed from their carrier.

In some cases it is advantageous to employ resilient means between the shelves and I have shown in Figure 2 springs between the shelves which encircle the corner posts. In Figure 1 only a few of the springs are shown. One advantage in the use of the springs is that it provides for the relative separation of the covers and their containers due to the expansion of the article being cooked during the cooking operation.

It will now be apparent that I have devised a new and useful apparatus for cooking which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention what I claim as new and desire to secure by Letters Patent, is:—

1. In an apparatus for cooking, a jacketed tank having separate compartments, a cover for each compartment, fastening means for the covers, an article carrier connected with a cover and having relatively movable shelves, article containers on the shelves having covers provided with lugs engaged by the shelf above it, a pressure feed screw to effect relative movement of the shelves while in their compartment, and means to introduce a cooking medium into said compartments.

2. In an apparatus for cooking, a jacketed tank having separate compartments, a cover for each compartment, fastening means for the covers, an article carrier connected with a cover and having relatively movable shelves, springs between juxtaposed shelves tending to separate them, article containers on the shelves having covers provided with lugs engaged by the shelf above it, a pressure feed screw to effect relative movement of the shelves while in their compartment, and means to introduce steam into said compartments.

3. In an apparatus for cooking, a jacketed tank having separate compartments, a cover for each compartment, fastening means for the covers, an article carrier connected with a cover and having relatively movable shelves, article containers on the shelves having covers provided with lugs engaged by the shelf above it, a pressure feed screw to effect relative movement of the shelves while in their compartment, means to introduce hot water or steam into said compartments, and means independent of said jacket to heat said compartments.

4. In an apparatus for cooking, a jacketed tank having separate compartments, a cover for each compartment, fastening means for the covers, an article carrier connected with a cover and having relatively movable shelves, article containers on the shelves having covers provided with lugs engaged by the shelf above it, a pressure feed screw to effect relative movement of the shelves while in their compartment, means to introduce a cooking medium into said compartments, a vacuum pipe for each compartment, means to introduce a heating or cooling medium into said jacket, and an external source of heat for each compartment.

5. In an apparatus for cooking, a jacketed tank open at the top, a removable cover sealing said top, a partition dividing the tank into compartments, separate means for each compartment to introduce therein hot water or steam, means to introduce a heating or cooling medium into said jacket, an external source of heat for each compartment, racks within said compartments carried by their respective covers and having relatively movable shelves, and means exterior of the tanks for effecting relative movement of said shelves.

6. In a cooker and presser, a tank, means to maintain therein a desired cooking temperature, a rack having superimposed shelves interconnected for relative vertical movement, a pressure transmitting member connected with one of said shelves, a screw to move said pressure transmitting member downwardly, article containers on said shelves having removable covers against which the pressure of said pressure transmitting member is exerted, a hanger fixed to said rack, a stationary track, and a trolley on said track connectable with said rack to lower it into and raise it from said tank and to transport it to a desired place of utilization.

7. In a cooker and presser, a tank closed at its sides and bottom and, a rack within the tank having superimposed shelves, a cover for sealing the top of said tank and removable from it with the rack connecting means between the cover and rack, means to secure said cover to said tank, and means to effect relative movement of said shelves and maintain them in the positions to which they have been adjusted when within or removed from the tank.

CHRISTOPHER OFFENHAUSER.